Figure 6:
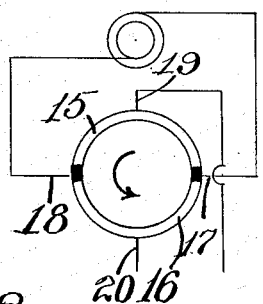

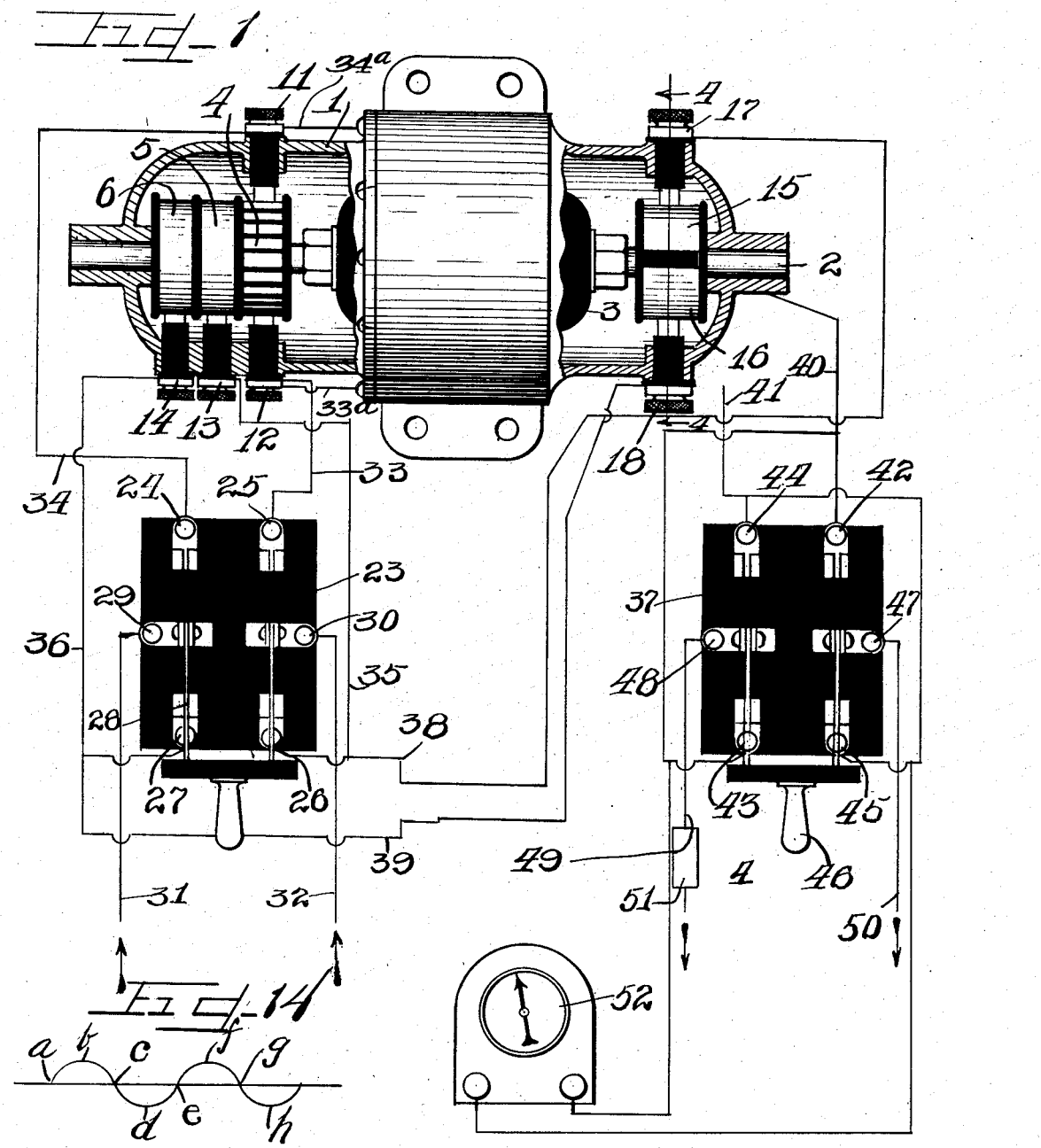

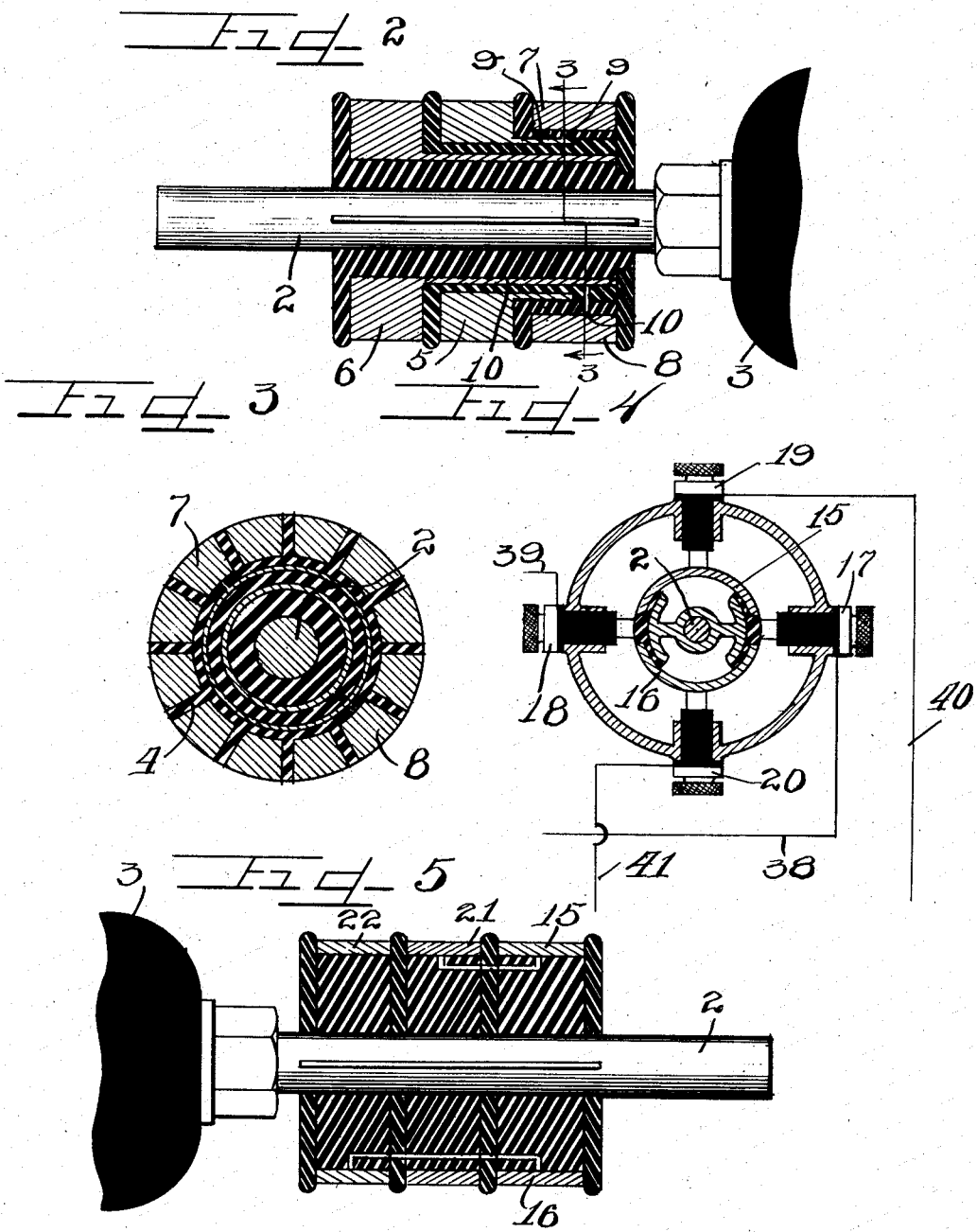

F. ADSIT.
MECHANICAL RECTIFIER.
APPLICATION FILED SEPT. 15, 1913.

1,212,874.

Patented Jan. 16, 1917.
3 SHEETS—SHEET 3.

Witnesses
J. W. Angell
Charles W. Hill Jr.

Inventor
Frank Adsit
Charles W. Hill
Atty.

UNITED STATES PATENT OFFICE.

FRANK ADSIT, OF CHICAGO, ILLINOIS.

MECHANICAL RECTIFIER.

1,212,874.  Specification of Letters Patent.  Patented Jan. 16, 1917.

Application filed September 15, 1913. Serial No. 789,764.

*To all whom it may concern:*

Be it known that I, FRANK ADSIT, a citizen of the United States, and a resident of the city of Chicago, in the county of Cook and State of Illinois, have invented certain new and useful Improvements in Mechanical Rectifiers; and I do hereby declare that the following is a full, clear, and exact description of the same, reference being had to the accompanying drawings, and to the numerals of reference marked thereon, which form a part of this specification.

Rectifiers for the purpose of converting an alternating current into a direct current for such purposes as charging storage batteries on electrical vehicles and the like have usually been built up of complicated mechanisms difficult of construction and costly of maintenance. In most cases the efficiency of the rectifiers is relatively low. This is especially true in the well known type of mercury rectifiers, and, although these have proved popular for small installations, the glass bulbs very often become broken, thus placing the device out of commission for a time and inconveniencing the user to a great extent.

This invention relates to a very simple device adapted to mechanically rectify an alternating current and where practically the only loss of power occurs in the actual power used for driving the device to overcome friction of the parts, and this is of necessity a small factor.

It is furthermore an object of this invention to construct a device free from sparking at all loads and requiring a number of rotations equal to only half of that of an ordinary two segment commutator and slip ring device.

It is finally an object of this invention to construct a device requiring a great deal less space than is usual in a ring and segment combination, thus relieving the bearings of shaft strains, and making the device desirable in other respects.

The invention (in a preferred form) is hereinafter more fully described and defined in the accompanying drawings and specification.

In the drawings: Figure 1 is a top plan view partly broken away and in section, illustrating a rectifying device with the wires and switches connected thereto. Fig. 2 is an enlarged sectional detail of a slip ring and commutator element at one end of the device. Fig. 3 is a section on line 3—3 of Fig. 2. Fig. 4 is a section on line 4—4 of Fig. 1, with parts in elevation. Fig. 5 is a modification of the elements shown in Fig. 4. Figs. 6 to 13 inclusive are diagrammatic views illustrating different operations for different points in the cycle of operation. Fig. 14 is a diagrammatic view illustrating a wave cycle of alternating current.

As shown in the drawings: The reference numeral 1, indicates as a whole a casing, formed, as shown, for the purpose of entirely inclosing the device and affording a support for the rotating elements therein. The reference numeral 2, indicates an armature shaft journaled in said casing 1, and provided with a rotatable armature 3. Said shaft on one end thereof is provided with a commutator 4, and slip rings 5 and 6, insulated and adjacent thereto, each one of said respective slip rings 5 and 6, being connected to an opposite commutator segment 7 and 8, by means of a wire 9 and 10, respectively. As stated, and as shown in the drawings, each of said slip rings and commutator are insulated from the armature shaft and from one another.

A pair of brushes denoted respectively by the reference numerals 11, and 12, bear upon said commutator 4. Likewise bearing on each of said respective slip rings 5 and 6, are brushes 13, and 14, one for each of said rings. Secured upon the opposite end of the armature shaft 2, is a two segment commutator consisting of the segments 15, and 16, respectively, insulated from one another and from the armature shaft. Two pair of brushes are adapted to bear upon said two segment commutator, the one pair being the a. c. brushes denoted respectively by the reference numerals 17 and 18, and the other pair of d. c. brushes 19 and 20, respectively.

As shown in Fig. 4, the pair of brushes 19 and 20, are arranged substantially at right angles to said brushes 17, and 18, and it is to be particularly noticed in this respect that the width of the insulation between the respective commutator segments 15 and 16, is greater than the area of bearing surface of any one of the brushes. In order to obviate positioning of the brushes 17, 18, 19, and 20, upon a single brush support, as shown in Fig. 4, I have illustrated a modification in Fig. 5 whereby the respective commutator segments 15 and 16, are each separately connected to one of a pair of insulated contact or slip rings 21, and 22, respectively, so that the respective brushes 17 and 18, may bear, upon the two segment commutator and the brushes 19 and 20, may bear upon the slip rings 21 and 22, respectively similar to the construction and arrangement shown for the commutators and rings 4, 5, and 6, respectively, secured on the opposite end of the commutator shaft.

A double pole two throw knife switch designated as a whole by the reference numeral 23, has secured thereon poles or terminal binding posts 24 and 25, which are respectively connected to the brushes 11, and 12. Likewise binding post terminals 26, and 27, are respectively connected to the brushes 13, and 14. A knife contact member 28, adapted to swing into contact with either of said pair of terminals is pivotally mounted centrally of the switch, each one of the insulated contact bars thereof, being connected to a terminal post 29 and 30, respectively.

It is therefore readily apparent that an inflowing alternating current flowing into the line wires 31 and 32, respectively will be caused to flow into the respective brushes 11 and 12, or, if the switch is in the position shown in Fig. 1, into the brushes 13, and 14, the terminals 24 and 25, being connected to said brushes 11 and 12, by wires 33 and 34, respectively, and to the field windings of the motor by wires 33ª and 34ª, leading from the brushes 12 and 11, respectively, to the terminals of the field windings. The terminals 26 and 27, are connected to the respective brushes 13 and 14, by means of wires 35, and 36.

When it is desired to start the device the knife switch member 28, is thrown into contact with the terminals 24, and 25, thus introducing an alternating current through the field windings and to the commutator 4, through the brushes 11 and 12, and after the device has started the knife member 28, is thrown into contact with the respective terminal members 26 and 27, to thereby introduce the current to the motor to drive the same through the respective slip rings 5 and 6. A similar double throw double pole knife switch 37, is connected to the d. c. brushes 19 and 20, respectively, for the purpose of changing the polarity or direction of flow of the direct current if desired.

As shown in Fig. 1, when the knife switch member 28, is thrown into contact with the terminals 26, and 27, the motor then becomes shunted across the main A. C. line and the alternating current to be rectified flows through the respective terminals 26 and 27, through the wires 38, and 39, which are connected at their ends to the a. c. brushes 17 and 18, respectively. Lead wires 40 and 41, are each respectively connected to the d. c. brushes 19 and 20, and the wire 40, is also connected to each of the terminals 42, and 43, of the knife switch 37. Likewise wire 41, is connected to each of the terminals 44, and 45, of said knife switch 37, so that as the knife switch member 46, is thrown into either one or the other of its extreme positions an electrical circuit is closed through either of the respective pairs of contacts 42, and 44, or 43 and 45, through the terminals 47, and 48, which are connected to the outgoing leads 49 and 50 thus determining the polarity of these leads. If desired, an impedance coil 51, may be inserted in the circuit of the outgoing leads 49, or 50, in order to correct any pulsating effect in the direct current flowing therethrough. Any suitable type of galvanometer 52, may be connected to said switch 37, for the purpose of determining the polarity of the direct current.

The operation is as follows: When it is desired to start the device the knife switch member 28, is thrown into contact with the respective terminals 24 and 25, thus closing the main power circuit, the fields of the motor being energized with alternating current of the same frequency as that of the source of power. The brushes 11 and 12, supply current to the armature, this current being initially of the frequency of the source of power. Due to the inter-action of the armature field and its field coils, the armature begins to move, the speed of the armature being gradually accelerated until it synchronizes with the speed of the generator furnishing the power. After the motor has become synchronized, the switch is thrown into its other extreme position to thereby introduce the current from the terminals 26 and 27, through the slip rings 5 and 6, on the commutator shaft. As already stated in this position of the switch the motor as a synchronous motor is shunted across the alternating current line and the alternating current flows through the wires 38, 39, to the brushes 17, and 18, respectively, to be rectified at the two segment commutator. The operation from hereon may be more easily followed by reference to Figs. 6 to 14 inclusive, wherein a part of a cycle is illustrated for each one eighth rotation of the commutator shaft. Assuming the two segment commutator to be in the position shown in Fig. 6, the a. c. brushes are shown in contact with the insulated portion of the commutator, and the commutator is so positioned and timed for rotation that in this position the alternating current is at a neutral point in its phase indicated by a reference letter a, in Fig. 14. As the commutator makes a one eighth revolution to the position shown in Fig. 7, the inner arrows denoting the direction of rotation of the commutator, the alternating current flows in at the brush 17, and out at the brush 18, and in the d. c. brushes the current flows outwardly from the segment 16, through the brush 20, and, of course, in an opposite direction in the brush 19, which is now in electrical communication with the a. c. brush 18, through the commutator segment 15.

Figure 7:
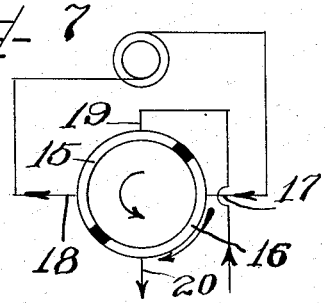

With the commutator in the position shown in Fig. 7, the alternating current is at one peak in the cycle as indicated by the reference letter *b*.

Figure 8:
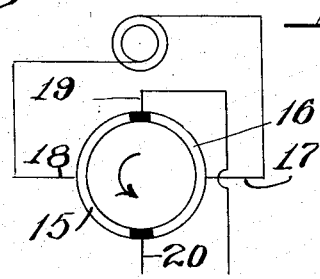
Figure 9:
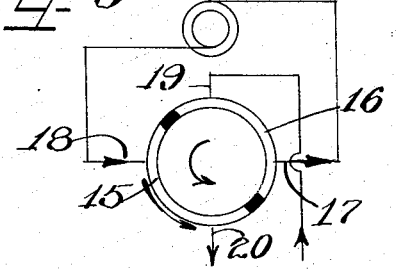
Figure 10:
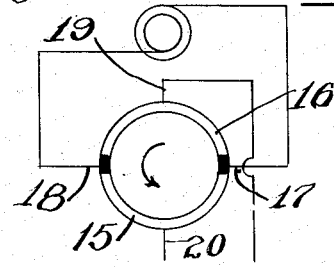
Figure 11:
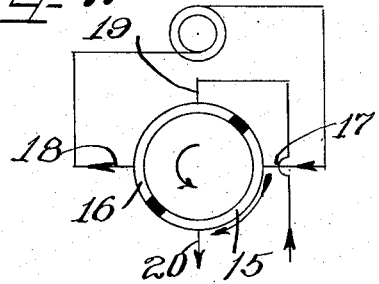
Figure 12:
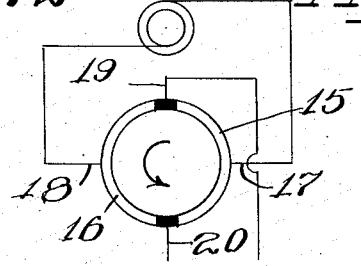
Figure 13:
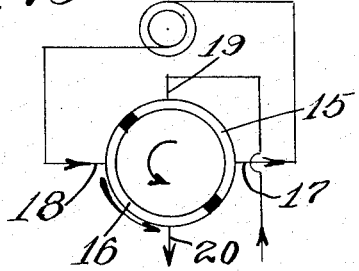

When the commutator has made an additional one eighth revolution or in all a quarter of a revolution, as shown in Fig. 8, the d. c. brushes 19 and 20, are in contact with the insulation of the commutator, and accordingly out of circuit for the moment, this being a neutral point, as indicated by the reference letter *c*, in the cycle of alternation of the alternating current. With another one eighth revolution, as shown in Fig. 9, the commutator segment 15, is in contact with the respective brushes 18, and 20, and the other segment 16, is in electrical communication with each of the brushes 17, and 19, respectively, so that the alternating current, which is now at the peak in the reversal of its cycle, as indicated by the reference letter *d*, flows inwardly through the brush 18, and outwardly through the brush 20, and inwardly through the brush 19, and outwardly through the brush 17, so that, as in Fig. 6, so far as the brushes are concerned, the current is flowing therethrough in the same direction as before, although of course, it is reversed through the brushes 17, and 18. The next point in the phase of the alternating current is a neutral point *e*, which as the alternating current reaches this point the commutator is in the position shown in Fig. 10, with the brushes 17, and 18, in contact with the insulated portion thereof, but contra-distinctive to the position shown in Fig. 6, the brushes 19, and 20, are now in contact with segments 16 and 15, respectively, whereas in Fig. 6, the aforesaid brushes were in contact with the respective segments in reverse order or 15 and 16. As the alternating current again rises to its peak point *f*, in positive direction, the commutator segment has rotated another one eighth revolution as shown in Fig. 11, and this position of the commutator corresponds with the position shown in Fig. 7, each of which are positioned for corresponding points in the phase of alternation of the current, and denoted respectively by the reference letters *e* and *f*. Accordingly, the direct current flows outwardly through the brush 20, said brush being in electrical communication with the brush 17, as shown. When the commutator has made still another one eighth revolution, and as shown in the position illustrated in Fig. 12, the brushes 19, and 20, are in contact with the insulated portions of the commutator, and this corresponds to a neutral point *g*, in the alternation of the alternating current, and with a continued rotation to the position shown in Fig. 13, the alternating current reverses through its peak *h*, and the commutator segments are in a position to properly direct the current through the d. c. brushes, to thus rectify the reversal in flow of the alternating current.

It is obvious that various details of construction of my device may be varied through a wide range without departing from the principles of the invention. I therefore do not purpose limiting the patent granted otherwise than necessitated by the prior art.

I claim as my invention:

1. In a device of the class described a self-starting synchronous motor adapted to be operated by an alternating current, a plurality of commutators on the shaft of said motor, slip rings adjacent one of said commutators, and means connected with said last mentioned commutator and with said rings adapted to transfer said alternating current independently of said motor to another of said commutators to be thereby rectified into a direct current.

2. In a device of the class described a motor, a plurality of multiple segment commutators mounted on either end thereof, multiple sets of brushes connected to said commutators, one set thereof adapted to receive an alternating current therethrough and another set adapted to take off a direct rectified current from one of said commutators.

3. In a device of the class described a motor, commutators on each end of the armature shaft thereof and insulated therefrom, an alternating current circuit, slip rings connected to one of said commutators at one end of said armature shaft tending to drive the motor shunted across said alternating current circuit, and brushes connected to the commutator at the other end of said shaft to lead the alternating current through said commutator, and brushes bearing upon said commutator adapted to take off a direct rectified current therefrom.

4. In a device of the class described a plurality of multiple segment commutators, means rotating the same in phase with an alternating current, and brushes bearing on one of said commutators adapted to lead an alternating current thereto and another pair of brushes to take a rectified direct current therefrom.

5. In a device of the class described for use with a source of alternating current, a motor, a multiple segment commutator mounted on the shaft thereof, slip rings mounted on said shaft adjacent to said commutator, said commutator and rings insulated from said shaft and from each other, said motor, rings and commutator adapted to be rotated as a unit by said alternating current, a second commutator mounted on said shaft, brushes bearing on said second commutator adapted to introduce an alternating current thereto, and brushes bearing on said second commutator at an angle to said first mentioned brushes adapted to take off the rectified current therefrom.

6. In a device of the class described for use with an alternating current, and a rectifier for said current comprising field magnets, a rotary shaft, an armature mounted on said shaft adapted to rotate in the field of said magnets, a multiple segment commutator on one end of said shaft, slip rings connected thereto, said commutator and said rings insulated from said shaft and from each other, brushes contacting said commutator and said rings, a two segment commutator mounted on the other end of said shaft and insulated therefrom, and a plurality of brushes contacting said two segment commutator to receive the rectified current therefrom.

In testimony whereof I have hereunto subscribed my name in the presence of two subscribing witnesses.

FRANK ADSIT.

Witnesses:
CHARLES W. HILLS, Jr.,
LEON M. REIBSTEIN.